US012753071B2

(12) United States Patent
Leturcq et al.

(10) Patent No.: US 12,753,071 B2
(45) Date of Patent: Oct. 6, 2026

(54) METHOD FOR SYNTHESISING A LIQUID ORGANIC HYDROGEN CARRIER (LOHC) LOADED WITH HYDROGEN USING HYDROGEN PRODUCED FROM A METHANISATION DIGESTATE

(71) Applicant: COMMISSARIAT A L'ENERGIE ATOMIQUE ET AUX ENERGIES ALTERNATIVES, Paris (FR)

(72) Inventors: Gilles Leturcq, Camaret-sur-Aigues (FR); Thibaud Delahaye, Tresques (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 460 days.

(21) Appl. No.: 18/569,889

(22) PCT Filed: Jun. 8, 2022

(86) PCT No.: PCT/FR2022/051090

§ 371 (c)(1),
(2) Date: Dec. 13, 2023

(87) PCT Pub. No.: WO2022/263748

PCT Pub. Date: Dec. 22, 2022

(65) Prior Publication Data

US 2024/0132343 A1 Apr. 25, 2024
US 2024/0228269 A9 Jul. 11, 2024

(30) Foreign Application Priority Data

Jun. 14, 2021 (FR) ....................................... 2106270

(51) Int. Cl.
*C01B 3/00* (2026.01)
*C01B 3/0015* (2026.01)
*C01B 3/04* (2026.01)
*C01B 3/047* (2026.01)

(52) U.S. Cl.
CPC ............ *C01B 3/0015* (2013.01); *C01B 3/047* (2013.01)

(58) Field of Classification Search
CPC .............................. C01B 3/0015; C01B 3/047
See application file for complete search history.

(56) References Cited

U.S. PATENT DOCUMENTS

2010/0040916 A1* 2/2010 Castaldi .................... C12P 3/00 423/658.2
2016/0061383 A1 3/2016 Arlt et al.

FOREIGN PATENT DOCUMENTS

WO 2007140441 A2 12/2007

OTHER PUBLICATIONS

Jorschick et al., Hydrogenation of aromatic and heteroaromatic compounds—a key process for future logistics of green hydrogen using liquid organic hydrogen carrier systems; Royal Society of Chemistry, Sustainable Energy & Fuels, vol. 5, pp. 1311-1346, (2021).
Lee et al., "Connected evaluation of polymer electrolyte membrane fuel cell with dehydrogenation reactor of liquid organic hydrogen carrier"; International Journal of Hydrogen Energy, vol. 45, pp. 13398-13405.
Rao et al., "Potential Liquid-Organic Hydrogen Carrier (LOHC) Systems: A Review on Recent Progress"; Energies, vol. 13, No. 6040, doi:10.3390/en13226040; pp. 1-23, (2020).
Search Report for International Application No. PCT/FR2022/051090 dated Sep. 30, 2022.

* cited by examiner

*Primary Examiner* — Yong L Chu
(74) *Attorney, Agent, or Firm* — Chrisman Gallo Tochtrop LLC

(57) ABSTRACT

A synthesis process of a liquid organic hydrogen carrier charged with hydrogen, Hn-LOHC, wherein a methanisation digestate is used as a hydrogen source, including at least the steps of:

a) production of gaseous ammonia from the methanisation digestate;
b) division of the gaseous ammonia produced in step a) into a first and a second flow;
c) catalytic amination of a liquid organic hydrogen carrier not charged with hydrogen, H0-LOHC, by reaction with the gaseous ammonia from the first flow to convert the H0-LOHC into an aminated H0-LOHC and produce hydrogen;
d) catalytic dissociation of gaseous ammonia from the second flow to produce hydrogen; and
e) catalytic hydrogenation of the aminated H0-LOHC obtained in step c), by reacting with the hydrogen produced in steps c) and d), whereby the Hn-LOHC is obtained.

16 Claims, 2 Drawing Sheets

METHOD FOR SYNTHESISING A LIQUID ORGANIC HYDROGEN CARRIER (LOHC) LOADED WITH HYDROGEN USING HYDROGEN PRODUCED FROM A METHANISATION DIGESTATE

CROSS-REFERENCE TO RELATED APPLICATIONS

This is a National Stage application of PCT international application PCT/FR2022/051090, filed on Jun. 8, 2022, which claims the priority of French Patent Application No. FR 2106270, filed Jun. 14, 2021, both of which are incorporated herein by reference in their entirety.

TECHNICAL FIELD

The invention relates to the field of hydrogen production, storage and transport.

More specifically, it relates to a synthesis process of a liquid organic hydrogen carrier (LOHC) charged with hydrogen wherein a methanisation digestate is used as a hydrogen source.

It also relates to a process for recycling organic waste as well as a process for producing hydrogen implementing this synthesis process.

Prior Art

On account of its high mass energy density (33 kWh/kg) and its ability to be oxidised in the presence of oxygen in the form of pure water without releasing $CO_2$, hydrogen is considered as an important energy carrier for completing the energy transition, in particular by substituting fossil fuels.

While hydrogen is capable of being used as a reagent in fuel cells to produce electricity, its primary use currently remains industry. Indeed, 75 million tonnes are consumed annually by the chemical industry, of which almost 45% for petroleum refining.

To date, steam reforming of hydrocarbons, essentially methane, is the most commonly used hydrogen production process for supplying industry with hydrogen as it is by far the most economical. Steam reforming consists of reacting, at temperature and in the presence of catalysts, methane with water to produce a mixture of $H_2$, $CO_2$, CO and water. At the steam reactor outlet, hydrogen is separated from $CO_2$ and an excess mixture of CO, methane and water vapour (known as syngas) which is used as a fuel to supply the heat required for steam reforming.

However, for each tonne of hydrogen produced by steam reforming, approximately 10 tonnes of $CO_2$ are emitted and generally released into the atmosphere.

Hydrogen production processes limiting, or suppressing, emissions of greenhouse gases, and, in particular, $CO_2$ are therefore under study to supplement its production by steam reforming or to progressively substitute it.

Among these processes, water electrolysis, which consists of breaking water down into oxygen and hydrogen with an electric current (which, ideally, must itself be obtained from a low greenhouse gas emission electricity production sectors such as the nuclear, wind or solar sector), represents a technology of choice.

Two main types of electrolysis are considered with, on one hand, so-called "low-temperature" processes which are based on the use of proton conductive polymer membranes (known as PEM for Proton Exchange Membrane) and, on the other, so-called "high-temperature" processes which are based on the use of anionic or proton conductive ceramic membranes in SOEC (Solid Oxide Electrolysis Cell) systems.

However, with a view to generalising the use of hydrogen in industrial sectors other than those of petrochemicals and in the transport and housing sector, there are, beside its low carbon-footprint production, two technological barriers to be removed, namely its storage and its transport.

Indeed, given its very low mass density, hydrogen storage and transport currently involve either its liquefaction at atmospheric pressure but at an extremely low temperature (−253° C.) or by its compression at very high pressure (70 MPa) with, in both cases, the need for a control of the risks associated with its tendency to leak on account of its small size, its flammability, its ability to detonate and its harmful action on the metals and alloys included in the composition of the equipment wherein it is confined.

For this reason, research is now oriented towards the development of LOHCs.

LOHCs are organic compounds that are liquid or semi-solid at ambient temperature which can be alternately charged with and discharged of hydrogen via catalytic hydrogenation and dehydrogenation reactions. LOHCs have a high hydrogen storage density and make it possible to transport hydrogen safely.

Typical examples of LOHCs are aromatic hydrocarbons such as toluene and naphthalene which, by hydrogenation, produce methylcyclohexane and decalin. The latter can then be packaged to be stored and/or transported to the location where they will be used to produce hydrogen by catalytic dehydrogenation. Hydrogenation and dehydrogenation processes on several cycles can thus be produced with these compounds—as illustrated hereinafter for the toluene/methylcyclohexane pair—without a significant loss of yield.

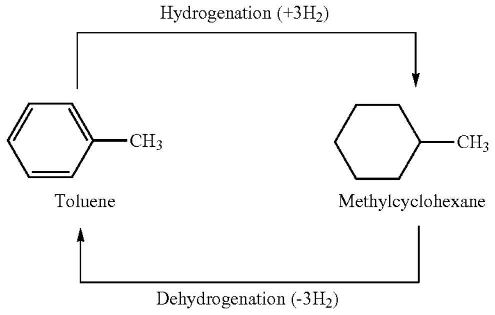

Toluene
Methylcyclohexane

For a focus on the recent developments achieved in terms of LOHCs, the reader is invited to refer to the article in the name of Purna Chandra Rao and Minyoung Yoon published in Energies 2020, 13(22), 1-23).

While LOHCs clearly represent a very interesting hydrogen storage and transport option, their integration in an energy and environmental transition strategy involves the possibility of hydrogenating them with hydrogen obtained from a production stream which is not only decarbonised but also inexpensive.

DISCLOSURE OF THE INVENTION

The aim of the invention is precisely that of providing a solution to these problems by proposing a process which makes it possible to synthesise an LOHC charged with hydrogen, annotated $H_n$-LOHC, using hydrogen produced from a methanisation digestate.

This process comprises at least the steps of:

a) production of gaseous ammonia from a methanisation digestate;

b) division of the gaseous ammonia produced in step a) into a first and a second flow;

c) catalytic amination of a liquid organic hydrogen carrier not charged with hydrogen, annotated $H_0$-LOHC, by reaction with the gaseous ammonia from the first flow to convert the $H_0$-LOHC into an aminated $H_0$-LOHC and produce hydrogen;

d) catalytic dissociation of the gaseous ammonia from the second flow to produce hydrogen; and e) catalytic hydrogenation of the aminated $H_0$-LOHC obtained in step c), by reaction with the hydrogen produced in steps c) and d), whereby the $H_n$-LOHC is obtained.

Thus, according to the invention:

gaseous ammonia ($NH_3$) is produced from a methanisation digestate, which it is reminded consists of an anaerobic residue of fermentation, or digestion, of organic waste (of agricultural, urban, industrial or other origin), a portion of the gaseous ammonia thus produced is used to aminate an LOHC not charged with hydrogen, $H_0$-LOHC, whereas the other portion of the gaseous ammonia is used to produce hydrogen usable for the conversion of the aminated $H_0$-LOHC into a LOHC charged with hydrogen, Ha-LOHC.

It is obvious that steps c) and d) can be carried out simultaneously or successively, in which case they can be carried out in any order, i.e. step c) can equally well be carried out after step d) as before step d).

According to the invention, the methanisation digestate is, preferably, a liquid digestate, i.e. corresponding to the liquid phase obtained when a methanisation digestate is subjected to a solid/liquid phase methanisation digestate, for example by means of a screw press, a belt press, a filter press or a centrifuge.

In step a), the gaseous ammonia is advantageously produced by desorption—also known as stripping—of the ammoniacal nitrogen (i.e. the assembly formed by ammonia in molecular form $NH_3$ and that in ionised form $NH_4^+$) present in the liquid methanisation digestate.

This desorption is, preferably, carried out by circulating the liquid digestate in a column equipped with a packing such as Raschig rings, Pall rings, Berl saddles or similar, against the flow of a gas called transfer gas which is either nitrogen or a gas essentially consisting of nitrogen such as air. The transfer gas can be pre-heated, for example to a temperature of 50° C.-70° C., so as to promote ammoniacal nitrogen desorption.

Alternatively, the desorption can also be carried out by evacuation (referred to as vacuum stripping).

In any case, the process advantageously further comprises a purification of the gaseous ammonia produced carried out, for example, by means of a membrane filter.

According to the invention, the $H_0$-LOHC is typically an aromatic or heteroaromatic, monocyclic or polycyclic, compound, optionally substituted by one or more alkyl, aryl, heteroaryl, arylalkyl or heteroarylalkyl groups, which meets, preferably, the following criteria:

be capable of carrying out entirely reversible hydrogen storage via catalytic processes;

have favourable thermal stability, thermodynamics and hydrogenation/dehydrogenation kinetics;

have a sufficiently low melting point, ideally less than −30° C., to be liquid or semi-liquid at ambient temperature (25° C.) and thus avoid having to use a solvent to render it liquid or semi-liquid;

have a high boiling point, ideally greater than 300° C., to simplify the purification of the hydrogen produced when the $H_n$-LOHC resulting from its hydrogenation undergoes a dehydrogenation;

be non-toxic, non-flammable and non-explosive under ambient temperature (25° C.) and pressure (100 kPa) conditions;

be widely available and inexpensive; and be capable of being transported under ambient temperature and pressure conditions using infrastructures which are currently used for liquid and semi-liquid fuels (pipelines, tanker trucks, etc.).

Thus, it can in particularly consist of:

toluene which gives, by hydrogenation, methylcyclohexane, 2-benzyltoluene or 4-benzyltoluene which give respectively, by hydrogenation, perhydro-2-benzyltoluene and perhydro-4-benzyltoluene, 2,3-dibenzyltoluene or 2,4-dibenzyltoluene which give respectively, by hydrogenation, perhydro-2,3-dibenzyltoluene and perhydro-2,4-dibenzyltoluene, naphthalene which gives, by hydrogenation, decalin, N-ethylcarbazole which gives, by hydrogenation, perhydro-N-ethylcarbazole, indole which gives, by hydrogenation, perhydroindole, 1-methylindole, 2-methylindole, 3-methylindole, 4-methyl-indole, 5-methylindole or 6-methylindole which give respectively, after hydrogenation, perhydro-1-methylindole, perhydro-2-methylindole, perhydro-3-methylindole, perhydro-4-methylindole, perhydro-5-methylindole and perhydro-6-methylindole, 1,2-dimethylindole, 2,3-dimethylindole or 2,5-dimethylindole which give respectively, after hydrogenation, perhydro-1,2-dimethylindole, perhydro-2,3-dimethylindole and perhydro-2,5-dimethylindole, dibenzofuran which gives, after hydrogenation, perhydrobenzofuran, phenazine which gives, after hydrogenation, perhydrophenazine, 2-(N-methylbenzyl)pyridine which gives, after hydrogenation, perhydro-2-(N-methylbenzyl)pyridine, or 4,4'-bipiperidine which gives, after hydrogenation, perhydro-4,4'-bipiperidine.

In step c), the catalytic amination of the $H_0$-LOHC results in the formation of an aminated $H_0$-LOHC and hydrogen according to the reaction:

$$H_0\text{-LOHC} + NH_3 \rightleftarrows H_0\text{-LOHC-}NH_2 + H_2$$

which in the case, for example, of toluene becomes:

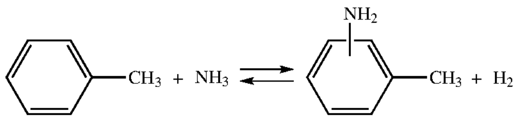

It should be noted that this amination reaction can result in the presence of several $NH_2$ groups on the same $H_0$-LOHC molecule.

This amination is advantageously carried out in a reactor heated to the temperature which is, preferably, chosen according to the catalyst used but which is typically between 200° C. and 800° C. and, more specifically, between 350° C. and 500° C. and at a pressure which is typically between 0.1 MPa and 90 MPa and, more specifically, between 1.5 MPa and 11 MPa. The catalyst is, for example, a ceramic-metal composite, based on a metallic oxide such as an oxide of zirconium, nickel, cobalt, aluminium, a rare earth (yttrium or cerium oxide for example), and one or more active metals chosen from nickel, copper, zinc, platinum group metals (ruthenium, rhodium, palladium, iridium and platinum), vanadium, titanium, aluminium, silicon and actinides (uranium and thorium in particular).

In order to increase the yield from the animation of the $H_0$-LOHC, it is possible to shift the chemical equilibrium of this reaction to the formation of hydrogen by consuming a portion of the hydrogen generated by this amination, in which case the amination is carried out in the presence of a oxidising gas such as oxygen, carbon monoxide, carbon dioxide, nitrogen monoxide, nitrogen dioxide, hydrogen peroxide or air.

Advantageously, the process further comprises a purification of the hydrogen produced by the catalytic amination of the $H_0$-LOHC, which is carried out, for example, by means of a membrane filter.

In step d), the catalytic dissociation of the gaseous ammonia results in the formation of nitrogen and hydrogen according to the reaction:

$$2NH_3 \rightarrow N_2 + 3H_2$$

This dissociation is advantageously carried out in a reactor heated to a temperature which is, preferably, chosen according to the catalyst used but which is typically between 450° C. and 800° C. and, more specifically, between 550° C. and 700° C. The catalyst is, for example a ceramic-metal composite comprising an active metal such as ruthenium, nickel or copper, and an oxide such as alumina, magnesia or a rare earth oxide such as cerine.

Here also, the process advantageously further comprises a purification of the hydrogen produced by the catalytic dissociation of gaseous ammonia, carried out, for example, by means of a membrane filter.

Regardless of the aminated $H_0$-LOHC to be hydrogenated, its hydrogenation is typically carried out with a high hydrogen pressure, preferably between 5 MPa and 10 MPa. As the reaction is exothermic and therefore releases heat, the reactor wherein the hydrogenation is carried out typically reaches a temperature between 100° C. and 200° C. These conditions can, obviously, vary according to the aminated $H_0$-LOHC and the catalyst used. The catalyst is, for example, a ceramic-metal composite comprising an active metal such as ruthenium, nickel or cobalt, and an oxide such as alumina, zirconia or a rare earth oxide such as cerine.

The hydrogen pressure is advantageously controlled in order to be limited to the hydrogenation reaction without reaching a hydrogenolysis which would initially result from the $NH_2$ group(s).

According to the invention, the reactor wherein the catalytic dissociation of the gaseous ammonia is carried out and, where applicable, that wherein the catalytic amination of the $H_0$-LOHC is carried out are advantageously heated by heat and/or electricity produced using a methanisation biogas. The same also advantageously applies for the transfer gas used for the desorption of the ammoniacal nitrogen if this transfer gas is pre-heated.

Thus, the synthesis process of an $H_n$-LOHC as defined above can advantageously be part of a process for recycling organic waste, which comprises at least the steps of:

- methanising the organic waste to produce a methanisation digestate and a biogas;
- synthesis of an $H_n$-LOHC from the methanisation digestate by implementing said synthesis process; and
- producing heat and/or electricity from the biogas.

The invention therefore also relates to such a process for recycling organic waste.

The invention further relates to a process for producing hydrogen, which comprises at least the steps of:

- synthesis of an $H_n$-LOHC by implementing a synthesis process of an $H_n$-LOHC as defined above;
- packaging the $H_n$-LOHC for storage and/or transport; and
- catalytic dehydrogenation of the Ha-LOHC thus packaged.

As known per se:

- the packaging of the $H_n$-LOHC can be carried out in the same type of containers as those used to package hydrocarbons, at ambient temperature and atmospheric pressure; whereas
- the catalytic dehydrogenation of the $H_n$-LOHC can be carried out in a reactor heated to a temperature which is, preferably, chosen according to the catalyst and the $H_n$-LOHC used but which is typically between 100° C. and 350° C. and, more specifically, between 150° C. and 300° C. The reaction is performed typically at atmospheric pressure. The catalyst is, for example, a ceramic-metal composite comprising a platinoid such as platinum or palladium, and an oxide such as alumina.

Other features and advantages of the invention will become apparent upon reading the following description which makes reference to the appended figures.

Of course, this further description is given only to illustrate the subject matter of the invention and is in no way intended to limit this subject matter.

DETAILED DISCLOSURE OF A PARTICULAR MODE OF IMPLEMENTATION

Figure 1:
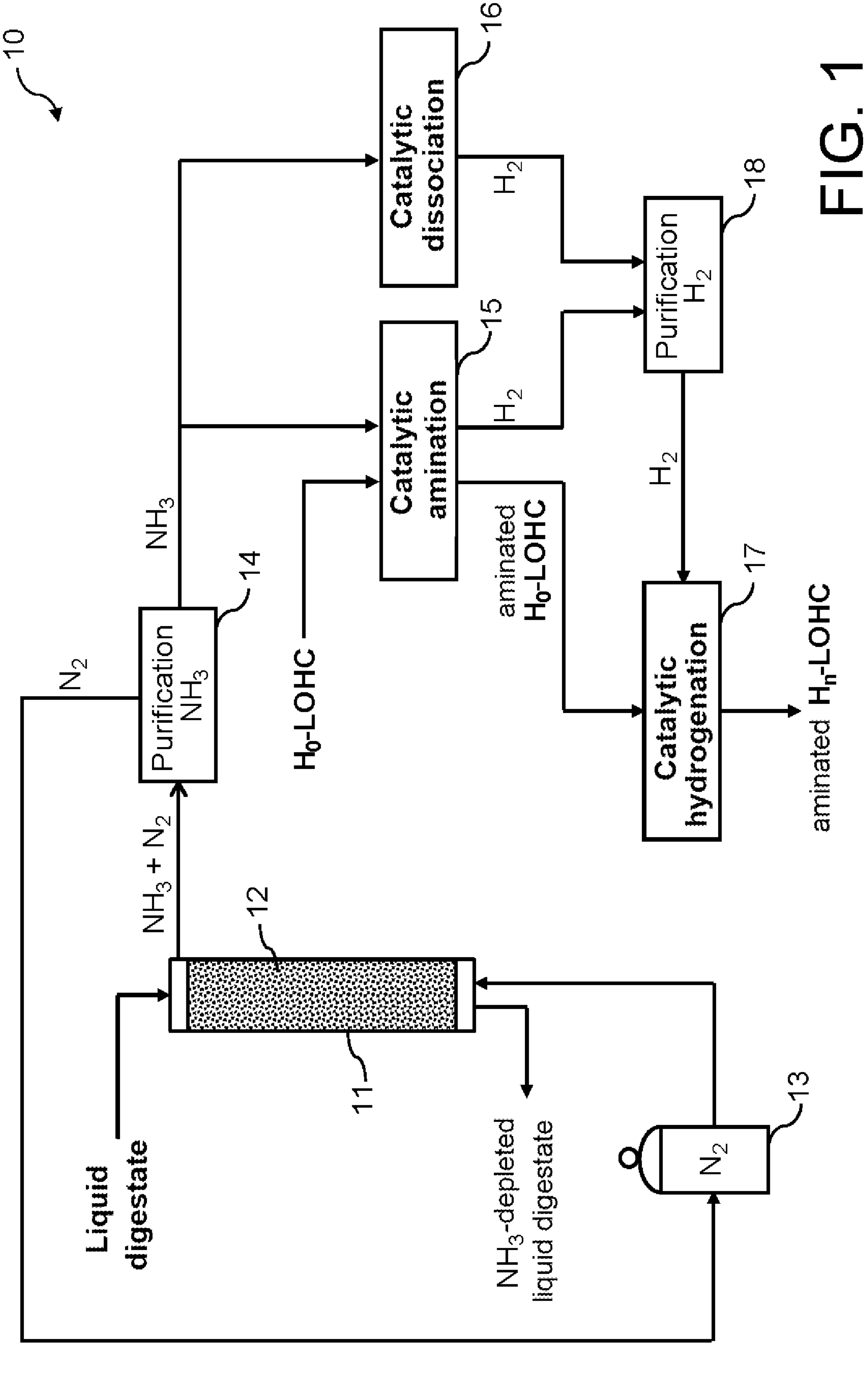
FIG. 1 schematically illustrates a preferred mode of implementation of the synthesis process of an $H_n$-LOHC according to the invention and embodiment of an installation designed for this mode of implementation.

Reference is made to FIG. 1 which schematically represents a preferred mode of implementation of the synthesis process of an $H_n$-LOHC according to the invention and embodiment of an installation, referenced 10, designed for this mode of implementation.

In this mode of implementation, the process comprises:

1. production of gaseous ammonia, $NH_3$, by desorption (or stripping) of ammoniacal nitrogen from a liquid digestate;

2. purification of the gaseous ammonia thus produced and splitting thereof into a first and a second flow;
3. catalytic amination of an $H_0$-LOHC by means of the gaseous ammonia from the first flow to convert this $H_0$-LOHC into an aminated $H_0$-LOHC and produce hydrogen;
4. catalytic dissociation of gaseous ammonia from the second flow to produce hydrogen;
5. purification of the hydrogen produced by the catalytic amination of the $H_0$-LOHC and by the catalytic dissociation of ammonia; and
6. catalytic hydrogenation of the aminated $H_0$-LOHC by means of the hydrogen thus purified to convert this aminated $H_0$-LOHC into an aminated $H_n$-LOHC.

For this purpose and as seen in FIG. 1, the installation 10 comprises a desorption column 11, which is filled with a packing 12 such as Raschig or Pall rings and wherein the production of gaseous ammonia is carried out.

The liquid digestate, which is subjected to this desorption, is obtained from the separation into a solid phase and a liquid phase of a methanisation digestate.

This liquid digestate essentially comprises nitrogen of which ammoniacal nitrogen, phosphorus in oxide form ($P_2O_5$), potassium in oxide form ($K_2O$), calcium in oxide form (CaO) and magnesium, also in oxide form (MgO), in variable concentrations according to the organic waste from which the methanisation digestate was obtained.

The column 11 is supplied:

at the top, with the liquid digestate via a pump (not shown in FIG. 1), and at the base, with a transfer gas which can be nitrogen or a gas essentially consisting of nitrogen such as air but which, in the case of the mode of implementation of the process illustrated in FIG. 1, is nitrogen, which is injected under pressure in the column 11 from a nitrogen source 13.

The liquid digestate and the nitrogen therefore circulate countercurrently in the column 11.

The nitrogen can be heated prior to its entry into the column 11, for example at a temperature of 50° C. to 70° C., to promote the desorption of the ammoniacal nitrogen.

At the top of the column 11, a gas phase is recovered essentially formed of ammonia and nitrogen and, at the base of the column 11, an ammoniacal nitrogen-depleted liquid digestate.

The gas phase thus recovered is directed towards a purification device 14, for example of the membrane filter type, making it possible to purify the ammonia by separating it from nitrogen and any other gases generated by the desorption, whereas the ammoniacal nitrogen-depleted digestate is removed from the process while being, for example, directed towards a storage unit (not shown in FIG. 1) with a view to subsequent spreading.

As seen in FIG. 1, the nitrogen coming out of the purification device 14 can, after itself undergoing an optional purification, be directed towards the nitrogen source 13 with a view to its reinjection into the column 11. Alternatively, it can also be removed from the process for its reuse in other applications or, more simply, its release into the atmosphere.

As regards the ammonia coming out of the purification device 14, it is split into two flows: a first flow which is directed towards a reactor 15 intended for the catalytic amination of the $H_0$-LOHC and which is, therefore, supplied with this $H_0$-LOHC, and a second flow which is directed towards a reactor 16 intended for the catalytic dissociation of ammonia.

In the reactor 15, the catalytic amination of the $H_0$-LOHC is, for example, carried out at a temperature between 350° C. and 500° C. and at a pressure between 1.5 MPa and 11 MPa, using an Ni/$CeO_2$ type catalyst.

As mentioned above, the yield from the animation of the $H_0$-LOHC can be increased by consuming a portion of the hydrogen generated by this amination, by supplying the reactor 15 with a oxidising gas such as oxygen, carbon monoxide, carbon dioxide, nitrogen monoxide, nitrogen dioxide, hydrogen peroxide or air. In which case, the portion of the hydrogen generated by the catalytic amination of the $H_0$-LOHC which is not consumed in the reactor 15 is evacuated from this reactor through, for example, a membrane filter to separate it from the oxidising gas.

Whether an oxidising gas is used or not for the catalytic amination of the $H_0$-LOHC, the hydrogen coming out of the reactor 15 is then directed towards a purification device 18, for example of the membrane filter type, whereas the aminated $H_0$-LOHC is directed towards a reactor 17 intended for its hydrogenation.

In parallel, in the reactor 16, the catalytic dissociation of the gaseous ammonia from the second flow from the purification device 14 is carried out. This dissociation is, for example, performed at a temperature between 550° C. and 700° C. and using an Ni/MgO catalyst.

The hydrogen produced in the reactor 16 is then directed towards the purification device 18 where it joins the hydrogen evacuated from the reactor 15.

Once purified by the purification device 18, the hydrogen is directed towards the reactor 17 to be used for the catalytic hydrogenation of the aminated $H_0$-LOHC.

This hydrogenation is, for example, carried out with a hydrogen pressure between 5 MPa and 10 MPa and using a Ru/$Al_2O_3$ type catalyst.

The aminated $H_n$-LOHC produced in the reactor 17 is then sent to a zone intended for its packaging (not shown in FIG. 1) for storage and/or transport.

Figure 2:
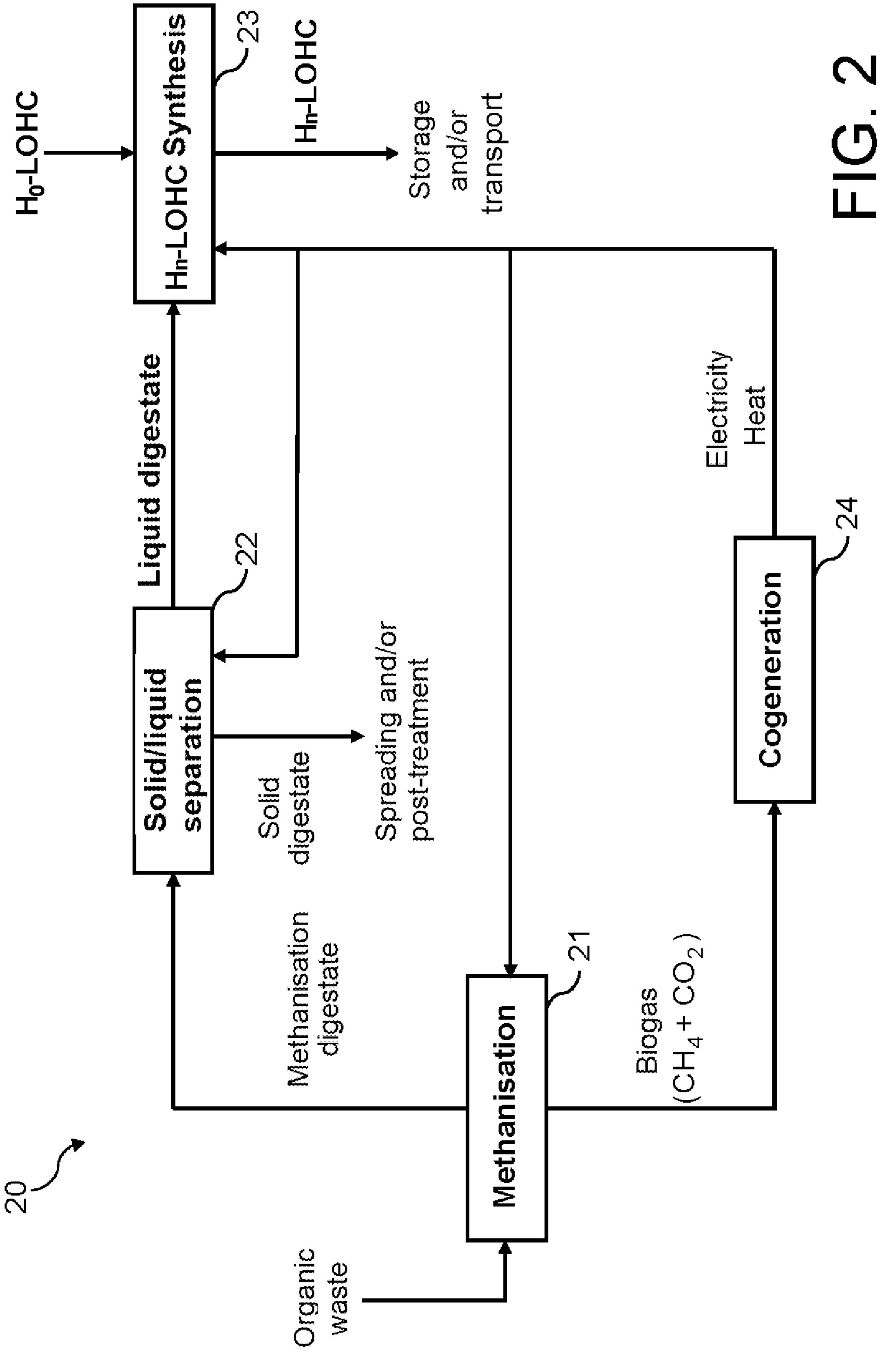
FIG. 2 schematically illustrates a preferred mode of implementation of the process for recycling organic waste according to the invention and embodiment of an installation designed for this mode of implementation.

Reference is made to FIG. 2 which schematically represents a preferred mode of implementation of the process for recycling organic waste according to the invention and an installation, referenced 20, designed for this mode of implementation.

In this mode of implementation, the process for recycling organic waste comprises:

1. methanisation of the organic waste to produce a methanisation digestate, on one hand, and a biogas, on the other;
2. separation of the methanisation digestate into a solid phase, referred to as solid digestate, and a liquid phase, referred to as liquid digestate;
3. synthesis of an $H_n$-LOHC from the liquid digestate by the synthesis process of an $H_n$-LOHC according to the invention; and
4. cogeneration, i.e. simultaneous production of electricity and heat, from the biogas.

For this purpose and as seen in FIG. 2, the organic waste, which can in particular be agricultural waste such as cattle manure, pig manure or cereal residue, urban waste such as household waste or wastewater treatment plant sludge, industrial waste such as agri-food industry waste, or a mixture of waste from different sources, are introduced into the methaniser, also known as digester, of a methanisation unit 21, wherein they are subjected to an anaerobic fermentation, typically at a temperature between 20° C. and 60° C., which results in the formation, on one hand, of a pasty product called methanisation digestate and, on the other, a biogas which essentially consists of $CH_4$ and $CO_2$.

The methanisation digestate, once evacuated from the methaniser 21, is directed towards a solid/liquid separation unit 22 wherein it is separated into a solid digestate and a liquid digestate, for example by means of one or more screw press, belt press, filter press or centrifuge type devices.

The solid digestate thus obtained can be sent to a storage unit (not shown in FIG. 2) with a view to subsequent spreading and/or to a post-treatment unit (not shown in FIG. 2) of the drying or composting unit type.

As regards the liquid digestate, it is directed towards an installation 23 intended for the synthesis of the $H_n$-LOHC, which can in particular be an installation of the type of that shown in FIG. 1. The $H_n$-LOHC thus synthesised is then directed towards a zone intended for its packaging (not shown in FIG. 2) for storage and/or transport.

In parallel, the biogas produced in the methaniser 21 is directed towards a cogeneration unit 24 comprising, for example, a gas turbine coupled with an alternator and a heat recovery unit.

As illustrated in FIG. 2, the electricity and/or heat thus produced can in particular be used for operating:

- the methanisation unit 21 and, in particular, for heating the methaniser,
- the solid/liquid separation unit 22, and/or
- the installation 23 intended for the synthesis of the $H_n$-LOHC and, in particular, for heating the transfer gas used for the desorption of ammoniacal nitrogen if the gaseous ammonia is produced by desorption and for heating the reactors wherein the catalytic dissociation of the gaseous ammonia and, where applicable, the catalytic amination of the $H_0$-LOHC are carried out.

Optimal recycling of organic waste is thus carried out.

CITATION

Purna Chandra Rao and Minyoung Yoon, Energies 2020, 13(22), 1-23

What is claimed is:

1. A synthesis process of a liquid organic hydrogen carrier charged with hydrogen, $H_n$-LOHC, comprising at least the steps of:

a) production of gaseous ammonia from a methanisation digestate;

b) division of the gaseous ammonia produced in step a) into a first and a second flow;

c) catalytic amination of a liquid organic hydrogen carrier not charged with hydrogen, $H_0$-LOHC, by reaction with the gaseous ammonia from the first flow to convert the $H_0$-LOHC into an aminated $H_0$-LOHC and produce hydrogen;

d) catalytic dissociation of the gaseous ammonia from the second flow to produce hydrogen; and e) catalytic hydrogenation of the aminated $H_0$-LOHC obtained in step c), by reaction with the hydrogen produced in steps c) and d), whereby the $H_n$-LOHC is obtained.

2. The process of claim 1, wherein the methanisation digestate is a liquid digestate comprising ammoniacal nitrogen.

3. The process of claim 2, wherein the production of gaseous ammonia comprises a desorption of the ammoniacal nitrogen of the liquid digestate in the form of gaseous ammonia.

4. The process of claim 3, wherein the desorption comprises a circulation of the liquid digestate in a packing column, against a flow of nitrogen or a gas essentially consisting of nitrogen.

5. The process of claim 1, further comprising a purification of the gaseous ammonia produced.

6. The process of claim 1, wherein the catalytic dissociation of the gaseous ammonia is carried out in a reactor heated to a temperature between 450° C. and 800° C.

7. The process of claim 1, further comprising a purification of the hydrogen produced by the catalytic dissociation of gaseous ammonia.

8. The process of claim 1, wherein the $H_0$-LOHC is an aromatic or heteroaromatic, monocyclic or polycyclic, compound, optionally substituted by one or more alkyl, aryl, heteroaryl, arylalkyl or heteroarylalkyl groups.

9. The process of claim 8, wherein the $H_0$-LOHC is toluene, 2-benzyltoluene, 4-benzyltoluene, 2,3-dibenzyltoluene, 2,4-dibenzyltoluene, naphthalene, N-ethylcarbazole, indole, 1-methylindole, 2-methylindole, 3-methylindole, 4-methylindole, 5-methylindole, 6-methylindole, 1,2-dimethylindole, 2,3-dimethylindole, 2,5-dimethylindole, dibenzofuran, phenazine, 2-(N-methylbenzyl)pyridine or 4,4'-bipiperidine.

10. The process of claim 1, wherein the catalytic amination of the $H_0$-LOHC is carried out in a reactor heated at a temperature between 200° C. and 800° C. and at a pressure between 0.1 MPa and 90 MPa.

11. The process of claim 1, further comprising a purification of the hydrogen produced by the catalytic amination of the $H_0$-LOHC.

12. The process of claim 1, wherein the catalytic hydrogenation of the aminated $H_0$-LOHC is carried out with a hydrogen pressure between 5 MPa and 10 MPa.

13. The process of claim 6, wherein the reactor is heated by heat or electricity produced from a methanisation biogas.

14. A process for recycling organic waste, comprising at least the steps of:

- methanisation of the organic waste to produce a methanisation digestate and a biogas;
- synthesis of a liquid organic hydrogen carrier charged with hydrogen, $H_n$-LOHC, from the methanisation digestate by implementing the process of claim 1; and
- production of heat or electricity from the biogas.

15. A process for producing hydrogen, comprising at least the steps of:

- synthesis of a liquid organic hydrogen carrier charged with hydrogen, $H_n$-LOHC, by implementing the process of claim 1;
- packaging the $H_n$-LOHC for storage or transport; and
- catalytic dehydrogenation of the $H_n$-LOHC thus packaged.

16. The process of claim 10, wherein the reactor is heated by heat or electricity produced from a methanisation biogas.

* * * * *